United States Patent
Hayashi et al.

(10) Patent No.: US 12,071,567 B2
(45) Date of Patent: Aug. 27, 2024

(54) MOISTURE RESISTANCE IMPROVER FOR WATER-BASED ADHESIVE FOR INORGANIC MATERIALS, AND WATER-BASED ADHESIVE FOR INORGANIC MATERIALS

(71) Applicant: Sanyo Chemical Industries, Ltd., Kyoto (JP)

(72) Inventors: Miyuki Hayashi, Kyoto (JP); Ai Kita, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 777 days.

(21) Appl. No.: 17/261,973

(22) PCT Filed: Jul. 24, 2018

(86) PCT No.: PCT/JP2018/027618
§ 371 (c)(1),
(2) Date: Jan. 21, 2021

(87) PCT Pub. No.: WO2020/021616
PCT Pub. Date: Jan. 30, 2020

(65) Prior Publication Data
US 2021/0292609 A1    Sep. 23, 2021

(51) Int. Cl.
| | | |
|---|---|---|
| C09J 11/08 | (2006.01) | |
| C08F 20/06 | (2006.01) | |
| C08F 20/08 | (2006.01) | |
| C09J 4/00 | (2006.01) | |
| C09J 103/02 | (2006.01) | |
| C09J 103/10 | (2006.01) | |
| C09J 129/04 | (2006.01) | |
| C09J 133/02 | (2006.01) | |

(52) U.S. Cl.
CPC ............ *C09J 11/08* (2013.01); *C08F 20/06* (2013.01); *C08F 20/08* (2013.01); *C09J 4/00* (2013.01); *C09J 103/02* (2013.01); *C09J 103/10* (2013.01); *C09J 129/04* (2013.01); *C09J 133/02* (2013.01)

(58) Field of Classification Search
CPC ... C09J 11/08; C09J 4/00; C09J 129/04; C09J 133/02; C08F 20/06; C08F 20/08
See application file for complete search history.

(56) References Cited

U.S. PATENT DOCUMENTS

| | | |
|---|---|---|
| 5,895,804 A | 4/1999 | Lee et al. |
| 6,084,021 A | 7/2000 | Chang et al. |
| 7,638,579 B2 | 12/2009 | Finch et al. |
| 2004/0254285 A1 | 12/2004 | Rodrigues et al. |
| 2004/0254290 A1 | 12/2004 | Rodrigues et al. |
| 2009/0156078 A1 | 6/2009 | Connaughton, I et al. |

FOREIGN PATENT DOCUMENTS

| | | |
|---|---|---|
| JP | s60-103070 A | 6/1985 |
| JP | H05-247882 A | 9/1993 |
| JP | H11-199786 A | 7/1999 |
| JP | 2005-036204 A | 2/2005 |
| JP | 2006-257595 A | 9/2006 |
| JP | 2007-9206 A | 1/2007 |
| JP | 2013-136864 A | 7/2013 |
| JP | 2014-028939 A | 2/2014 |
| WO | 2014/022654 A2 | 2/2014 |

OTHER PUBLICATIONS

International Search Report mailed Aug. 28, 2018, issued for PCT/JP2018/027618.

*Primary Examiner* — Ling Siu Choi
*Assistant Examiner* — Andrea Wu
(74) *Attorney, Agent, or Firm* — Locke Lord LLP; James E. Armstrong, IV; Nicholas J. DiCeglie, Jr.

(57) ABSTRACT

Provided are a moisture resistance improver that yields a water-based adhesive for inorganic materials having exceptional adhesiveness of inorganic materials, and a water-based adhesive for inorganic materials in which the moisture resistance improver is used. The present invention is a moisture resistance improver (J) for a water-based adhesive for inorganic materials containing at least one (co)polymer (A) selected from the group consisting of (co)polymer (A1) and (co)polymer (A2). (Co)polymer (A1): a (co)polymer having a weight-average molecular weight of 3,000-150,000, and containing, as structural monomers, a C3-30 unsaturated (poly)carboxylic acid (anhydride) (a1) and a (meth)acrylic acid ester (a2) having solubility of 10 g or less per 100 g of water at 25° C. (Co)polymer (A2): a (co)polymer having a weight-average molecular weight of 6,000-150,000, and containing the above unsaturated (poly)carboxylic acid (anhydride) (a1) as a structural monomer but not containing the above (meth)acrylic acid ester (a2) as a structural monomer.

6 Claims, No Drawings

MOISTURE RESISTANCE IMPROVER FOR WATER-BASED ADHESIVE FOR INORGANIC MATERIALS, AND WATER-BASED ADHESIVE FOR INORGANIC MATERIALS

TECHNICAL FIELD

The present invention relates to a moisture resistance improver for a water-based adhesive for inorganic materials, and a water-based adhesive for inorganic materials.

BACKGROUND ART

Conventionally, an adhered product of inorganic material having heat resistance such as an inorganic fiber laminate is composed of inorganic fibers such as glass wool and rock wool, and in order to adhere the inorganic fibers, it is produced by molding the inorganic fibers to which a binder has been adhered, into a mat shape or the like by mechanical means. Adhered product of inorganic materials like such inorganic fiber laminates are widely used as heat insulating materials for buildings and various devices. As the binder, a water-based binder made of a phenol resin, which is a condensate of a phenol compound and formaldehyde, has conventionally been widely used. However, the binder commonly contains formaldehyde and there is a problem that formaldehyde is released into the environment from a laminate using the same. Therefore, an improved binder containing no formaldehyde has been proposed (see, for example, Patent Document 1).

PRIOR ART DOCUMENT

Patent Document

Patent Document 1: JP-A-2007-9206

SUMMARY OF THE INVENTION

Problems to be Solved by the Invention

However, although the binder of Patent Document 1 is a composition comprising an aqueous solution of an oligomer or co-oligomer composed of an ethylenically unsaturated carboxylic acid and having a number-average molecular weight of 300 to 900 and a polyol, the adhesiveness of the binder is insufficient.

It is an object of the present invention to provide a moisture resistance improver for affording a water-based adhesive for inorganic materials being superior in adhesiveness of inorganic materials with no aforementioned problems, and a water-based adhesive for inorganic materials using the same.

Solutions to the Problems

The present inventors have accomplished the present invention as a result of studies performed for attaining the above-mentioned object. That is, the present invention is a moisture resistance improver (J) for a water-based adhesive for inorganic materials, the moisture resistance improver (J) comprising at least one (co)polymer (A) selected from the group consisting of the following (co)polymer (A1) and (co)polymer (A2), (co)polymer (A1): a (co)polymer comprising an unsaturated (poly)carboxylic acid (anhydride) (a1) having 3 to 30 carbon atoms and a (meth)acrylic acid ester (a2) having a solubility at 25° C. of 10 g or less per 100 g of water as constituent monomers, and having a weight-average molecular weight of 3,000 to 150,000

(co)polymer (A2): a (co)polymer comprising an unsaturated (poly)carboxylic acid (anhydride) (a1) defined above as a constituent monomer with the proviso that no (meth)acrylic acid ester (a2) defined above being contained as a constituent monomer, and having a weight-average molecular weight of 6,000 to 150,000.

Advantages of the Invention

The moisture resistance improver (J) for a water-based adhesive for inorganic materials of the present invention has the following effects.

(1) To impart superior adhesiveness to a water-based adhesive (X) for inorganic materials.
(2) To impart superior moisture resistance to adhered product of inorganic materials, especially inorganic fiber laminates.
(3) To impart superior rigidity to adhered product of inorganic materials, especially inorganic fiber laminates.

MODE FOR CARRYING OUT THE INVENTION

<Unsaturated (poly)carboxylic acid (anhydride) with 3 to 30 carbon atoms (a1) (hereinafter, also simply referred to as unsaturated (poly)carboxylic acid (anhydride) (a1))>

The unsaturated (poly)carboxylic acid (anhydride) (a1) in the present invention is a (poly)carboxylic acid (anhydride) having one polymerizable unsaturated group and having 3 to 30 carbon atoms, the term 'carbon atoms' may hereinafter be abbreviated as C. In the present invention, the unsaturated (poly)carboxylic acid (anhydride) means an unsaturated monocarboxylic acid, an unsaturated polycarboxylic acid and/or an unsaturated polycarboxylic acid anhydride.

Of the (a1), examples of the unsaturated monocarboxylic acid include aliphatics (C3 to C24, e.g., acrylic acid, methacrylic acid, α-ethylacrylic acid, crotonic acid, isocrotonic acid), and alicyclics (C6 to C24, e.g., cyclohexenecarboxylic acid); and examples of the unsaturated poly(di to tri or more) carboxylic acids (anhydrides) include unsaturated dicarboxylic acids (anhydrides) [aliphatic dicarboxylic acids (anhydrides) (C4 to C24, e.g., maleic acid, fumaric acid, itaconic acid, citraconic acid, mesaconic acid, and anhydrides thereof), alicyclic dicarboxylic acids (anhydrides) (C8 to C24, e.g., cyclohexendicarboxylic acid, cycloheptenedicarboxylic acid, bicycloheptenedicarboxylic acid, methyltetrahydrophthalic acid, and anhydrides thereof)]. The (a1) may be used singly or two or more species thereof may be used in combination.

Of the above (a1), acrylic acid, methacrylic acid, maleic acid, and maleic anhydride are preferred from the viewpoint of the adhesiveness of inorganic materials. Acrylic acid and methacrylic acid are more preferred, and acrylic acid is particularly preferred.

<(Meta)acrylic acid ester having a solubility at 25° C. of 10 g or less per 100 g of water (a2) (hereinafter, also simply referred to as (meth)acrylic acid ester (a2))>

Examples of the (meth)acrylic acid ester (a2) in the present invention include those having a solubility at 25° C. of 10 g or less per 100 g of water, e.g., ethyl (meth)acrylate, butyl (meth)acrylate, 2-ethylhexyl (meth)acrylate, decyl (meth)acrylate, isodecyl (meth)acrylate, dodecyl (meth)acrylate, tridecyl (meth)acrylate, tetradecyl (meth)acrylate, hexadecyl (meth)acrylate, octadecyl (meth)acrylate, eicosyl (meth)acrylate, 2-octylnonyl (meth)acrylate, 1-hexyltridecyl (meth)acrylate, 2-butylheptadecyl (meth)acrylate, 1-octylpentadecyl (meth)acrylate, 2-decyltetradecyl (meth)acrylate, 2-dodecylhexadecyl (meth)acrylate, and the foregoing (meth)acrylic acid esters in which one carbon-carbon covalent bond in the alkyl group has been substituted with one ether linkage.

Of the (a2), from the viewpoint of the adhesiveness of inorganic materials and moisture resistance, alkyl (said alkyl having 2 to 28 carbon atoms) (meth)acrylates esters are preferred. Those in which the alkyl has 4 to 20 carbon atoms are more preferred, and particularly preferred are those in which the alkyl ester is a branched chain alkyl ester, or a combination of a linear alkyl ester and a branched alkyl.

<(Co)polymer (A1)>

The (co)polymer (A1) in the present invention is a (co)polymer comprising the unsaturated (poly)carboxylic acid (anhydride) (a1) and the (meth)acrylic acid ester (a2) as constituent monomers [hereinafter, may be referred to as constituent units].

The weight ratio [(a1)/(a2)] of the monomers constituting the (A1) is preferably 60/40 to 99/1, more preferably 60/40 to 98/2, and particularly preferably 70/30 to 97/3, from the viewpoint of the adhesiveness of inorganic materials and moisture resistance.

The weight-average molecular weight of the (co)polymer (A1) [hereinafter, abbreviated as Mw, measured by the gel permeation chromatography (GPC) method described later] is 3,000 to 150,000, preferably 6,000 to 100,000, and particularly preferably 9,000 to 45,000, from the viewpoint of adhesiveness and handling.

The conditions for GPC measurement of Mw in the present invention are as follows. The following are examples, and other devices may be used as long as equivalent measurement is ensured.

<GPC Measurement Conditions>

[1] Device: gel permeation chromatography [model code "HLC-8120GPC", manufactured by Tosoh Corporation]
[2] Column: "TSKgel G6000PWxl" and "TSKgel G3000PWxl" [both manufactured by Tosoh Corporation] are connected in series.
[3] Eluent: solution prepared by dissolving 0.5% by weight sodium acetate in methanol/water=30/70 (volume ratio)
[4] Reference substance: polyethylene glycol (hereinafter abbreviated as PEG)
[5] Injection conditions: sample concentration: 0.25% by weight, column temperature: 40° C.

<(Co)polymer (A2)>

The (co)polymer (A2) in the present invention comprises an unsaturated (poly)carboxylic acid (anhydride) (a1) defined above as a constituent monomer with the proviso that no (meth)acrylic acid ester (a2) defined above is included as a constituent monomer. In other words, the content of the (meth)acrylic acid ester (a2) as a constituent monomer is zero.

The weight-average molecular weight of the (co)polymer (A2) [measured by the gel permeation chromatography (GPC) method described above] is 6,000 to 150,000, preferably 6,000 to 100,000, and particularly preferably 9,000 to 45,000, from the viewpoint of adhesiveness and handling.

The (A1) and (A2) may be copolymers further comprising an unsaturated monomer (x) other than the monomers (a1) and (a2) as a constituent monomer as long as the effects of the present invention are not impaired.

Examples of the unsaturated monomer (x) include hydroxyalkyl (C1 to C5) (meth)acrylate, (meth)acrylamide, styrene, allylamine, and (meth)acrylonitrile.

The content of the (x) is preferably 20% by weight or less, more preferably 5% by weight or less, and particularly preferably 1% by weight or less, based on the total weight of the (a1) and (a2).

The (co)polymers (A1) and (A2) each can be produced by a known solution polymerization method, and a solution polymerization method containing water is preferred from the viewpoint of productivity. The content of the water to be used is preferably 40% by mass or more with respect to the total amount of the solvent to be used, and it is preferable that the whole solvent to be used is water.

When an organic solvent is used, it may be desolvated after polymerization and dissolved in water, or it may be used as it is without being desolvated. Examples of organic solvents that can be used singly or in combination with water include hydrophilic solvents (having a solubility in water at 25° C. of 10 g or more per 100 g water), such as ketones (acetone, methyl ethyl ketone (hereinafter abbreviated as MEK), diethyl ketone, etc.), and alcohols (methanol, ethanol, isopropanol, etc.), and acetone, MEK, and isopropanol are preferred from the viewpoint of productivity. The organic solvent can be used singly or two or more species thereof may be used in combination.

The (A1) and (A2) are obtained, for example, in the form of a solution (preferably an aqueous solution from an industrial point of view), and the content (% by weight) of the (A1) and (A2) in the solution is preferably 5 to 80%, more preferably 10 to 70%, and particularly preferably 20 to 60% from the viewpoint of the productivity and the handleability during the subsequent step, namely the production of a water-based adhesive.

The polymerization temperature during the production of the (A1) and (A2) is preferably 0 to 200° C., and more preferably 40 to 150° C. from the viewpoint of the productivity and the molecular weight control of the (A1) and (A2).

The polymerization time is preferably 1 to 10 hours, and more preferably 2 to 8 hours from the viewpoint of reduction in the residual monomer content in the product and the productivity.

The end point of the polymerization reaction can be confirmed from the amount of the residual monomer. The amount of residual monomer is preferably 5% or less, and more preferably 3% or less based on the weights of the (A1) and (A2) from the viewpoint of adhesiveness to inorganic materials. The amount of residual monomers can be measured by gas chromatography.

<Moisture Resistance Improver (J) for a Water-Based Adhesive for Inorganic Materials>

The moisture resistance improver (J) for a water-based adhesive for inorganic materials of the present invention comprises at least one (co)polymer (A) selected from the group consisting of the (co)polymer (A1) and the (co)polymer (A2) defined above.

Of the (co)polymer (A), the (A1) or a combination of the (A1) and (A2) is preferred, and the (A1) is more preferred from the viewpoint of adhesiveness, moisture resistance, and rigidity.

When the (A1) and (A2) are used in combination, the weight ratio [(A1)/(A2)] of the (A1) to the (A2) is preferably 30/70 to 95/5, more preferably 40/60 to 90/10, and particularly preferably 50/50 to 85/15.

The weight of the (A) based on the weight of the (J) is preferably 10 to 80% by weight, and more preferably 20 to 60% by weight, from the industrial and handling points of view.

The moisture resistance improver (J) is suitably used as a moisture resistance improver for a water-based adhesive for inorganic materials (X) described later.

<Main Agent (D)>

The main agent (D) in the present invention is, for example, at least one species selected from the group consisting of starch (D1), polyvinyl alcohol (D2), a sugar (D3) made up of 3 to 20 monosaccharides, and a polyvalent carboxylic acid (D4) having a valence of 5 or more.

Examples of the starch (D1) include cornstarch made from corn, and oxidized starch.

As the polyvinyl alcohol (D2), known ones can be used, and the weight-average molecular weight (Mw) thereof is preferably 5,000 to 100,000, and more preferably 10,000 to 50,000. The degree of saponification thereof is preferably 70 to 100, and more preferably 80 to 100.

The sugar (D3) is a sugar made up of 3 to 20 monosaccharides, and preferably a sugar made up of 3 to 15 monosaccharides. Examples of the sugar (D3) include trisaccharides (raffinose, etc.) and oligosaccharides. Of the sugars (D3), oligosaccharides are preferred from the viewpoint of adhesiveness.

Examples of the polyvalent carboxylic acid (D4) include polyacrylic acid (Mw: 1,000 to 5,000).

Of the main agents (D), the (D1), (D2) and (D4) are preferred, the (D1) and (D2) are more preferred, and the (D1) is particularly preferred from the viewpoint of adhesiveness and rigidity.

<Crosslinking Agent (C)>

The crosslinking agent (C) in the present invention is one having at least two functional groups capable of reacting with the main agent (D). The crosslinking agent (C) may be, for example, at least one species selected from the group consisting of urea (C1), a boron compound (C2), a polyamine (C3), an alkanolamine (C4), and a polycarboxylic acid (C5) with a valence of 2 to 4.

Examples of the boron compound (C2) include borax and boric acid.

Examples of the polyamine (C3) include 1,6-hexanediamine and triethylenehexamine.

Examples of the alkanolamine (C4) include isopropanolamine, diethanolamine, and triethanolamine.

Examples of the polycarboxylic acid (C5) with a valence of 2 to 4 include maleic acid, trimellitic acid, and ethylenetetracarboxylic acid.

<Water-Based Adhesive (X) for Inorganic Materials>

The water-based adhesive (X) for inorganic materials of the present invention comprises the moisture resistance improver (J), the main agent (D), the crosslinking agent (C), and water.

This water-based adhesive (X) for inorganic materials can be used as a water-based adhesive for inorganic materials (glass, ceramic, metal), and in particular, can be suitably used as a water-based adhesive for inorganic fibers such as glass wool and rock wool (so-called water-based binder for inorganic fibers).

The weight of the (co)polymer (A) based on the total weight of the main agent (D) and the crosslinking agent (C) <(A)/[(D)+(C)]> is preferably 1 to 25% by weight, more preferably 3 to 15% by weight, and particularly preferably 5 to 10% by weight from the viewpoint of rigidity and adhesiveness.

The combination [(D)/(C)] of the main agent (D) and the crosslinking agent (C) is preferably (D1)/(C1), (D1)/(C3), (D1)/(C4), (D1)/(C5), (D2)/(C2), (D2)/(C5), (D3)/(C1), (D3)/(C3), (D3)/(C4), (D3)/(C5), (D4)/(C3), and (D4)/(C4), more preferably (D1)/(C1), (D2)/(C2), (D3)/(C3), (D4)/(C3), and (D4)/(C4), and particularly preferably (D1)/(C1) and (D2)/(C2).

The total weight of the (A), (D) and (C) based on the weight of the water-based adhesive (X) is preferably 10 to 70% by weight, more preferably 20 to 60% by weight, and particularly preferably 30 to 50% by weight from the viewpoint of handleability.

The content of water is preferably 25 to 85% by weight, more preferably 35 to 75% by weight, and particularly preferably 45 to 65% by weight, based on the weight of the water-based adhesive (X).

If necessary, the water-based adhesive (X) for inorganic materials of the present invention may comprise a curing accelerator (sodium hypophosphate, ammonia, etc.) as long as the effects of the present invention are not impaired. The content of the curing accelerator is preferably 1 to 15% by weight, more preferably 2 to 10% by weight, and particularly preferably 3 to 5% by weight, based on the total weight of the (A), (D) and (C) from the viewpoint of adhesiveness.

The method for producing the water-based adhesive (X) for inorganic materials of the present invention is not particularly limited as long as it is a method by which the moisture resistance improver (J) comprising the (co)polymer (A), the main agent (D), the crosslinking agent (C), water, and the curing accelerator, which is added as needed, can be mixed and dispersed. The mixing time is, for example, 30 minutes to 3 hours, and the uniform mixing of the water-based adhesive (X) for inorganic materials can be visually confirmed.

The water-based adhesive (X) may be obtained by mixing the (J), (D), (C), and curing accelerator each in the form of a solution, preferably an aqueous solution.

The water-based adhesive (X) for inorganic materials of the present invention does not contain formaldehyde because it is not formed of a conventional phenolic resin, which is a condensate of a phenol compound and formaldehyde. Further, the water-based adhesive (X) for inorganic materials is extremely superior in the adhesiveness of inorganic materials, the moisture resistance and rigidity of adhered product of inorganic materials evaluated by the methods described later.

The water-based adhesive (X) for inorganic materials of the present invention is suitably used especially as a water-based adhesive for inorganic fiber, which is a heat-resistant laminate material.

Examples of the inorganic fiber include glass fiber, slag fiber, rock wool, asbestos, and metal fiber.

<Adhered Product of Inorganic Material>

The adhered product of inorganic material of the present invention is an inorganic material adhered with a cured material of the water-based adhesive for inorganic materials (X). When the inorganic material is inorganic fiber, the adhered product of inorganic material of the present invention is preferably an inorganic fiber laminate described later.

In the adhered product of inorganic material, the amount of the cured water-based adhesive (X) adhered based on the weight of the inorganic material is preferably 0.5 to 30% by weight, more preferably 1 to 20% by weight, and particularly preferably 2 to 15% by weight from the viewpoint of the adhesiveness of the inorganic material and the rigidity and moisture resistance of the adhered product of inorganic material.

<Inorganic Fiber Laminate>

The inorganic fiber laminate is an inorganic fiber laminate in which a cured material of the water-based adhesive (X) is adhered to an inorganic fiber laminate. That is, it can be obtained, for example, by adhering the water-based adhesive (X) to inorganic fibers, laminating them to form a laminate, and then heating and molding it, or, alternatively, laminating inorganic fibers or their strands (fiber bundles) to form a laminate, spraying the water-based adhesive (X) to the laminate to adhere, and heating and molding the laminate.

Examples of the method for adhering the water-based adhesive (X) to the inorganic fibers or their laminate include known methods such as an air spray method or an airless spray method, a padding method, an impregnation method, a roll coating method, a curtain coating method, a beater deposition method, and a coagulation method.

The amount of the cured water-based adhesive (X) adhered based on the weight of the inorganic fibers (inorganic fiber laminate) constituting the inorganic fiber laminate is preferably 0.5 to 30% by weight, more preferably 1 to 20% by weight, and particularly preferably 2 to 15% by weight from the viewpoint of the adhesiveness of the inorganic fibers, the smoothness of the laminate surface, and the rigidity and moisture resistance of the laminate.

In the production of the adhered product of inorganic material (preferably, inorganic fiber laminate) of the present invention, the water-based adhesive (X) is, for example, adhered to an inorganic material (preferably, inorganic fiber) in an appropriate amount, and then heated and cured.

The heating temperature is preferably 100 to 400° C., and more preferably 200 to 350° C. from the viewpoints of the adhesiveness and moisture resistance of the laminate, suppression of coloring of the laminate, and the industrial point of view.

The heating time is preferably 2 to 90 minutes, and more preferably 5 to 40 minutes from the viewpoints of the reaction rate and suppression of coloring of the adhered product of inorganic material (preferably, inorganic fiber laminate).

The moisture resistance improver (J) and the water-based adhesive (X) for inorganic materials of the present invention are superior in the adhesiveness of inorganic materials (preferably, inorganic fibers), and can impart superior rigidity and moisture resistance to an adhered product of inorganic material (preferably, inorganic fiber laminate). It is supposed that the compositions of the (J) and (X) make it easy for a molten adhesive to efficiently gather at the adhesive surface of the inorganic material or, in the case of inorganic fibers, at the intersections of the inorganic fibers during curing, the curing efficiently advances at the adhesive surface or at the intersections, and thereby the cured product has superior resin properties.

EXAMPLES

The present invention is further described in detail below by means of Examples, but the present invention is not limited thereto. In the following, parts and % mean parts by weight and % by weight, respectively.

Example 1

An autoclave was charged with 435 parts of isopropanol [solvent], and the atmosphere in the autoclave was replaced by nitrogen by introducing nitrogen gas under stirring (gas phase oxygen concentration: 500 ppm or less). The temperature was raised to 82° C. under blowing of nitrogen, then a solution in which 4.5 parts of 2,2'-azobis(2-methylbutyronitrile) [initiator] was dissolved in 100 parts of isopropanol (without using 3-mercaptopropionic acid [chain transfer]) and a mixed solution of 282 parts of acrylic acid (a1-1) and 7.9 parts of 2-ethylhexyl acrylate (a2-5) were added dropwise simultaneously over 3 hours, and then a polymerization reaction was performed at 82° C. for 2 hours with stirring.

After that, isopropanol in the solution was removed, water was added such that the nonvolatile content became 40%, and thus a moisture resistance improver (J-1) for a water-based adhesive for inorganic materials [aqueous solution] comprising a (co)polymer (A-1) was obtained. The (A-1) had an Mw of 12,000 and an acid value of 760 mg KOH/g.

Examples 2 to 10

The respective moisture resistance improvers (J) were obtained in the same manner as in Example 1 except that the reaction composition (parts) shown in Table 1 was used.

Example 11

An autoclave was charged with 170 parts of water [solvent], and the atmosphere in the autoclave was replaced by nitrogen by introducing nitrogen gas under stirring (gas phase oxygen concentration: 500 ppm or less). The temperature was raised to 100° C. under blowing of nitrogen, then a solution [initiator] in which 36.4 parts of sodium hypophosphate [reducing agent] was dissolved in 145 parts of water, 13.3 parts of hydrogen peroxide solution (30% aqueous solution) [oxidizing agent], and 310 parts of acrylic acid (a1-1) were added dropwise simultaneously over 3 hours, and then a polymerization reaction was performed at 100° C. for 2 hours with stirring.

After that, water was added such that the nonvolatile content became 40%, and thus a moisture resistance improver (J-11) for a water-based adhesive for inorganic materials [aqueous solution] comprising a (co)polymer (A-11) was obtained. The (A-11) had an Mw of 9,400 and an acid value of 780 mg KOH/g.

Examples 12 to 15, Comparative Example 1

The respective moisture resistance improvers (J) were obtained in the same manner as in Example 1 except that the reaction composition (parts) shown in Table 1 was used. The results are shown in Table 1.

Production Example 1

Into a vessel was charged 60 parts of water, and 30 parts of starch "cornstarch (Y)" [manufactured by Sanwa Starch Co., Ltd.] (D-1) was charged over 1 hour with stirring. Thereto was charged 10 parts of urea (C-1), and the mixture was further stirred for 1 hour, affording an aqueous solution [40%] in which (D-1) and (C-1) were dissolved.

Production Example 2

Into a vessel was charged 60 parts of water, and 22 parts of oxidized starch "Oji Ace L" [manufactured by Oji Cornstarch Co., Ltd.] (D-2) was charged over 1 hour with stirring. Thereto was charged 18 parts of trimellitic acid (C-2), and the mixture was further stirred for 1 hour, affording an aqueous solution [40%] in which (D-2) and (C-2) were dissolved.

Production Example 3

Into a vessel was charged 60 parts of water, and 38 parts of polyvinyl alcohol "JL-05E" [manufactured by Japan Vam & Poval Co., Ltd.] (D-3) was charged over 1 hour with stirring. Thereto was charged 2 parts of borax (C-3), and the mixture was further stirred for 1 hour, affording an aqueous solution [40%] in which (D-3) and (C-3) were dissolved.

Production Example 4

Into a vessel was charged 32 parts of water, and 56 parts of an aqueous solution of polyacrylic acid (D-4) [Mw=4000, concentration: 50%] was charged over 1 hour with stirring. Thereto was charged 12 parts of triethanolamine (C-4), and the mixture was further stirred for 1 hour, affording an aqueous solution [40%] in which (D-4) and (C-4) were dissolved.

Production Example 5

Into a vessel was charged 60 parts of water, and 30 parts of sugar [MALTRIN (registered trademark) M200, manufactured by Sansho Co., Ltd.] (D-5) was charged over 1 hour with stirring. Thereto was charged 10 parts of 1,6-hexanediamine (C-5), and the mixture was further stirred for 1 hour, affording an aqueous solution [40%] in which (D-5) and (C-5) were dissolved.

Examples 16 to 43, Comparative Example 2

The respective water-based adhesives (X) for inorganic materials were prepared by charging and mixing the ingredients in a vessel according to the compounding composition (parts) shown in Tables 2 and 3. Using the obtained water-based adhesives (X), inorganic fiber laminate specimens were prepared in the following manner, and each was evaluated by the methods described below. The results are shown in Tables 2 and 3.

<Preparation of Inorganic Fiber Laminate>

A glass fiber laminate having a length×width×thickness of 30 cm×30 cm×2 cm and a density of 0.035 g/cm³ was placed in a release-treated flat mold having a length×width×depth of 30 cm×30 cm×5 cm.

Next, each of the water-based adhesives was uniformly sprayed onto the laminate using an air spray such that the amount of the cured material adhered was 15% of the weight of the laminate. Then, it was heat-treated (dried and cured) for 40 minutes in a circulating air dryer at 220° C., affording a laminate (S-1) having a thickness of about 2 cm and a density of 0.040 g/cm³. In the same manner, five laminates (S-1) were prepared in total.

(1) Evaluation of Adhesiveness

A specimen having a length×width×thickness of 10 cm×1.5 cm×2 cm was cut out from each laminate (S-1). For the five specimens, the tensile strength was measured using an autograph [model code "AGS-500D", manufactured by Shimadzu Corporation] in accordance with "7.4 Tensile strength" of JIS R3420 "Testing methods for textile glass products". Using the average value of the five specimens, the adhesiveness was evaluated according to the following criteria.

<Evaluation Criteria>

★: 500 N/m² or more
◉: 450 N/m² or more and less than 500 N/m²
○: 400 N/m² or more and less than 450 N/m²
Δ: 300 N/m² or more and less than 400 N/m²
x: Less than 300 N/m²

(2) Evaluation of Moisture Resistance

Five specimens having a length×width×thickness of 10 cm×1.5 cm×2 cm were cut out from each laminate (S-1). They were placed in a constant temperature and humidity device at 50° C. and 80% humidity for 60 minutes. After that, they were taken out and allowed to stand on a sieve having a mesh size of 400 μm for 60 minutes at 25° C. and 30% RH.

For the specimens subjected to the moisture resistance test described above, the tensile strength was measured in the same manner as in (1) above, and [(the strength after moisture resistance test)×100/the strength of (1) above (unit: %)] was calculated. The moisture resistance was evaluated according to the following criteria.

<Evaluation Criteria>

★: 90% or more
◉: 80% or more and less than 90%
○: 70% or more and less than 80%
Δ: 60% or more and less than 70%
x: Less than 60%

(3) Evaluation of Rigidity

A laminate having a length of 30 cm×a width of 0.5 cm×a thickness of 2 cm was cut out from each laminate (S-1), and this was used as a specimen having a length×width×thickness of 30 cm×2 cm×0.5 cm. A specimen was placed on a test bench with a distance between fulcrums of 25 cm, the deflection rate of the specimen at 25° C. was measured. Using the average value of the five specimens, the rigidity was evaluated according to the following criteria.

Deflection rate (%) of specimen=deflection (mm)×100/250

<Evaluation Criteria>

★: Deflection rate is less than 1.0%.
◉: Deflection rate is 1.0% or more and less than 2.0%.
○: Deflection rate is 2.0% or more and less than 3.0%.
Δ: Deflection rate is 3.0% or more and less than 5.0%.
x: Deflection rate is 5.0% or more.

TABLE 1

| | | | Examples | | | | | | | | | | | | | Comparative Example 1 |
|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 | Comparative 1 |
| Moisture resistance improver for water-based adhesive for inorganic materials | | | J-1 | J-2 | J-3 | J-4 | J-5 | J-6 | J-7 | J-8 | J-9 | J-10 | J-11 | J-12 | J-13 | J-14 | J-15 | Comparative J-1 |
| (Co) polymer (A) | | | A-1 | A-2 | A-3 | A-4 | A-5 | A-6 | A-7 | A-8 | A-9 | A-10 | A-11 | A-12 | A-13 | A-14 | A-15 | Comparative A-1 |
| Reaction composition (part) | Solvent | Water | 435 | — | — | — | 100 | — | — | — | — | — | — | — | 150 | 150 | 170 | 50 |
| | | Isopropanol | — | 270 | 450 | 500 | 300 | 380 | 250 | 300 | 320 | 280 | 170 | 505 | 250 | 300 | 50 | 95.1 |
| | Chain transfer agent | 3-Mercaptopropionic acid | — | — | 4.7 | 2.8 | — | 2.9 | — | 1.2 | — | — | — | — | 0.7 | — | — | — |
| | Initiator | 2,2′-Azobis (2,4-dimethylvaleronitrile) | 4.50 | 0.25 | 0.2 | 1.55 | 2.23 | 0.26 | 1.3 | 1.37 | 0.1 | 0.14 | — | 0.75 | 3.89 | 0.52 | — | 0.31 |
| | | 2,2′-Azobis (2-methylbutyronitrile) | — | 0.8 | 1.7 | — | — | 1.55 | — | — | 0.37 | — | — | — | — | — | — | — |
| | | Hydrogen peroxide solution (30% aqueous solution) | — | — | — | — | — | — | — | — | — | — | 13.3 | — | — | — | — | — |
| | | Sodium hypophosphate | — | — | — | — | — | — | — | — | — | — | 36.4 | — | — | — | 6.9 | — |
| | | Isopropanol | 100 | 55 | 60 | 60 | 50 | 60 | 40 | 50 | 50 | 30 | — | 85 | 50 | 30 | — | 10.5 |
| | | Water | — | 150 | — | — | — | — | — | — | — | — | 145 | — | — | — | 100 | — |
| | Unsaturated (poly) carboxylic acid (anhydride) (a1) | Acrylic acid (a1-1) | 282 | — | 123 | 270 | 265 | — | 165 | 270 | 280 | 300 | 310 | 330 | 250 | — | 300 | — |
| | | Methacrylic acid (a1-2) | — | — | — | — | — | — | — | — | — | — | — | — | — | — | — | — |
| | | Maleic anhydride (a1-3) | — | — | — | — | — | 250 | — | — | — | — | — | — | — | — | — | — |
| | (Meth) acrylic acid ester (a2) | Butyl acrylate (a2-1) | — | 30 | — | — | — | — | — | — | — | 50 | — | — | — | — | — | — |
| | | Ethyl acrylate (a2-2) | — | — | — | — | 12 | — | — | — | — | 50 | — | — | — | — | — | — |
| | | 2-(2-Ethylhexyloxy) ethyl methacrylate (a2-3) | — | — | — | — | — | — | 70 | — | — | — | — | — | — | — | — | — |
| | | Isodecyl methacrylate (a2-4) | — | — | — | 37 | — | 11 | — | — | — | — | — | — | — | — | — | — |
| | | 2-Ethylhexyl acrylate (a2-5) | 7.9 | — | — | — | — | — | — | — | 15 | — | — | — | — | — | — | — |
| | | Octadecyl acrylate (a2-6) | — | — | — | — | — | — | — | 5 | — | — | — | — | — | 380 | — | — |
| | | Hexacosyl acrylate (a2-7) | — | — | 82 | — | — | — | — | — | — | — | — | — | — | — | — | — |
| | Monomer (X) | Acrylamide | — | — | — | — | — | — | — | — | — | — | — | — | — | — | — | 55.0 |
| Properties of (co) polymer (A) | | Mw | 12,000 | 26,000 | 3,900 | 8,000 | 18,000 | 6,000 | 20,000 | 11,000 | 49,000 | 95,000 | 9,400 | 15,000 | 6,700 | 48,000 | 81,000 | 12,000 |
| | | Acid value | 760 | 645 | 468 | 680 | 745 | 925 | 465 | 763 | 740 | 580 | 780 | 778 | 650 | 965 | 780 | 0 |
| | | Weight ratio | 97/3 | 83/17 | 60/40 | 88/12 | 96/4 | 96/4 | 70/30 | 98/2 | 95/5 | 75/15 | — | — | — | — | — | — |

TABLE 1-continued

|  | Examples | | | | | | | | | | | | | | | Comparative Example 1 |
|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 | |
| [(a1)/(a2)] | | | | | | | | | | | | | | | | |

TABLE 2

| | | | Examples | | | | | | | | | | | | | | |
|---|---|---|---|---|---|---|---|---|---|---|---|---|---|---|---|---|---|
| | | | 16 | 17 | 18 | 19 | 20 | 21 | 22 | 23 | 24 | 25 | 26 | 27 | 28 | 29 | 30 |
| Water-based adhesive for inorganic materials | | | X-1 | X-2 | X-3 | X-4 | X-5 | X-6 | X-7 | X-8 | X-9 | X-10 | X-11 | X-12 | X-13 | X-14 | X-15 |
| Compounding composition (part) | Moisture resistance improver (J) | J-1 | 2 | — | — | — | — | — | — | — | — | — | — | — | — | 2.5 | — |
| | | J-2 | — | 3 | — | — | — | — | — | — | — | — | — | — | — | — | 2 |
| | | J-3 | — | — | 2.5 | — | — | — | — | — | — | — | — | — | — | — | — |
| | | J-4 | — | — | — | 2 | 1.5 | — | — | — | — | — | — | — | — | — | — |
| | | J-5 | — | — | — | — | — | 2.5 | — | — | — | — | — | — | — | — | — |
| | | J-6 | — | — | — | — | — | — | 3 | — | — | — | — | — | — | — | — |
| | | J-7 | — | — | — | — | — | — | — | 2 | — | — | — | — | — | 3 | — |
| | | J-8 | — | — | — | — | — | — | — | — | 1 | — | — | — | — | — | — |
| | | J-9 | — | — | — | — | — | — | — | — | — | 6 | — | 2 | — | — | — |
| | | J-10 | — | — | — | — | — | — | — | — | — | — | 2 | — | — | — | — |
| | | Comparative J-1 | — | — | — | — | — | — | — | — | — | — | — | — | — | — | — |
| | Solution of main agent (D) and crosslinking agent (C) | Aqueous solution of (D-1) and (C-1) | 40 | 32 | 21 | — | — | — | — | — | — | — | — | — | 25 | — | — |
| | | Aqueous solution of (D-2) and (C-2) | — | — | — | 45 | — | — | — | — | — | — | — | — | 25 | — | 26 |
| | | Aqueous solution of (D-3) and (C-3) | — | — | — | — | 45 | 35 | — | — | — | — | — | — | — | 26 | — |
| | | Aqueous solution of (D-4) and (C-4) | — | — | — | — | — | — | 22 | 25 | — | — | — | — | — | — | — |
| | | Aqueous solution of (D-5) and (C-5) | — | — | — | — | — | — | — | — | 28 | 24 | 20 | — | — | — | — |
| | CURING ACCELERATOR | Sodium hypophosphate | — | 5 | — | — | — | — | — | — | 3 | — | — | — | — | — | 1 |
| | Water | | 50 | 50 | 50 | 50 | 50 | 50 | 50 | 50 | 50 | 50 | 50 | 50 | 50 | 50 | 50 |
| Weight (%) of (A) based on the total weight of (D) and (C) | | | 5 | 9 | 12 | 4 | 3 | 7 | 14 | 8 | 4 | 25 | 8 | 8 | 12 | 10 | 8 |
| Evaluation results | Adhesiveness | | ⊙ | ★ | ○ | ⊙ | ⊙ | ⊙ | ⊙ | ○ | ⊙ | ⊙ | ⊙ | ⊙ | ○ | ⊙ | ⊙ |
| | Water resistant | | ★ | ○ | ★ | ⊙ | ★ | ⊙ | ○ | ○ | ⊙ | ★ | ○ | ★ | ⊙ | ★ | ○ |
| | Rigidity | | ○ | ⊙ | ⊙ | ○ | ○ | ○ | ⊙ | ⊙ | ⊙ | ★ | ★ | ⊙ | ⊙ | ⊙ | ○ |

TABLE 3

| | | | Examples | | | | | | | | | | | | | Comparative Example 2 |
|---|---|---|---|---|---|---|---|---|---|---|---|---|---|---|---|---|
| | | | 31 | 32 | 33 | 34 | 35 | 36 | 37 | 38 | 39 | 40 | 41 | 42 | 43 | |
| Water-based adhesive for inorganic materials | | | X-16 | X-17 | X-18 | X-19 | X-20 | X-21 | X-22 | X-23 | X-24 | X-25 | X-26 | X-27 | X-28 | Comparative X-1 |
| Compounding composition (part) | Moisture resistance improver (J) | J-11 | 3 | 2 | — | — | — | — | — | — | — | — | 5 | — | — | — |
| | | J-12 | — | — | 1 | — | — | — | — | — | 2.5 | — | 2.5 | — | 2.5 | — |
| | | J-13 | — | — | — | 5 | — | 2 | — | — | — | — | — | — | — | — |
| | | J-14 | — | — | — | — | 2.5 | — | — | — | — | — | — | — | — | — |
| | | J-15 | — | — | — | — | — | — | 3 | 2 | — | — | — | 1 | — | — |
| | | Comparative J-1 | — | — | — | — | — | — | — | — | — | — | — | — | — | 5 |
| | Solution of main agent (D) and crosslinking agent (C) | Aqueous solution of (D-1) and (C-1) | 30 | 40 | 28 | 22 | — | — | — | — | — | — | — | — | 22 | 22 |
| | | Aqueous solution of (D-2) and (C-2) | — | — | — | — | 20 | 30 | — | — | — | — | — | — | — | — |
| | | Aqueous | — | — | — | — | — | — | 34 | — | — | — | — | — | 22 | — |

TABLE 3-continued

|  |  | Examples | | | | | | | | | | | | | Comparative |
|---|---|---|---|---|---|---|---|---|---|---|---|---|---|---|
|  |  | 31 | 32 | 33 | 34 | 35 | 36 | 37 | 38 | 39 | 40 | 41 | 42 | 43 | Example 2 |
|  | solution of (D-3) and (C-3) | | | | | | | | | | | | | | |
|  | Aqueous solution of (D-4) and (C-4) | — | — | — | — | — | — | — | 25 | — | — | 27 | — | — | — |
|  | Aqueous solution of (D-5) and (C-5) | — | — | — | — | — | — | — | — | 30 | 28 | — | — | — | — |
| Curing accelerator | Sodium hypophosphate | 2 | — | — | — | — | — | — | — | — | 3 | — | — | — | 2 |
|  | Water | 50 | 50 | 50 | 50 | 50 | 50 | 50 | 50 | 50 | 50 | 50 | 50 | 50 | 50 |
| Weight (%) of (A) based on the total weight of (D) and (C) | | 10 | 5 | 4 | 23 | 13 | 7 | 9 | 6 | 8 | 18 | 9 | 5 | 11 | — |
| Evaluation results | Adhesiveness | ★ | ⊙ | ★ | ○ | ★ | ○ | ★ | ⊙ | ⊙ | ★ | ⊙ | ⊙ | ○ | x |
|  | Moisture resistance | ⊙ | ○ | ⊙ | ○ | ○ | ○ | ⊙ | ○ | ○ | ○ | ○ | ○ | ○ | Δ |
|  | Rigidity | ○ | ★ | ○ | ⊙ | ○ | ⊙ | ⊙ | ○ | ★ | ○ | ⊙ | ⊙ | ★ | x |

The results in Tables 1 to 3 shows that the moisture resistance improver (J) for a water-based adhesive for inorganic materials of the present invention imparts superior inorganic materials (especially, inorganic fibers) adhesiveness to a water-based adhesive for inorganic materials as compared with the comparative ones, and also imparts superior moisture resistance and rigidity to an adhered product of inorganic material (especially, inorganic fiber laminate).

INDUSTRIAL APPLICABILITY

The moisture resistance improver (J) for a water-based adhesive for inorganic materials and the water-based adhesive (X) for inorganic materials of the present invention are suitable for adhering inorganic materials (especially, glass fiber, which is inorganic fiber that is made into a heat-resistant laminate), and the adhered product of inorganic material (especially, inorganic fiber laminate) using the water-based adhesive can be applied to a wide range of fields such as, especially, heat insulating materials, heat reserving materials, sound absorbing materials, etc. of buildings and various devices. Therefore, they are extremely useful.

The invention claimed is:

1. A moisture resistance improver for a water-based adhesive for inorganic materials, the moisture resistance improver comprising at least one (co)polymer (A) selected from the group consisting of the following (co)polymer (A1) and (co)polymer (A2),
    (co)polymer (A1): a (co)polymer comprising an unsaturated (poly)carboxylic acid (anhydride) (a1) having 3 to 30 carbon atoms and a (meth)acrylic acid ester (a2) having a solubility at 25° C. of 10 g or less per 100 g of water as constituent monomers, and having a weight-average molecular weight of 3,000 to 150,000
    (co)polymer (A2): a (co)polymer comprising an unsaturated (poly)carboxylic acid (anhydride) (a1) defined above as a constituent monomer with the proviso that no (meth)acrylic acid ester (a2) defined above being contained as a constituent monomer, and having a weight-average molecular weight of 6,000 to 150,000
    wherein, in the moisture resistance improver, the (co)polymer (A) is either
    (1) a combination of the (co)polymer (A1) defined above and the (co)polymer (A2) defined above; or
    (2) the (co)polymer (A1) with the proviso that the (meth)acrylic acid ester (a2) as constituent monomer in the (co)polymer (A1) is a combination of a linear alkyl ester having the linear alkyl of from 2 to 28 carbon atoms and a branched chain alkyl ester having the branched chain alkyl of from 8 to 28 carbon atoms.

2. The moisture resistance improver according to claim 1, wherein the (a1) is at least one species selected from the group consisting of acrylic acid, methacrylic acid, maleic acid, and maleic anhydride.

3. The moisture resistance improver according to claim 1, wherein the weight ratio of the (a1) to the (a2) [(a1)/(a2)] in the constituent monomers of the (co)polymer (A1) is 60/40 to 99/1.

4. The moisture resistance improver according to claim 2, wherein the weight ratio of the (a1) to the (a2) [(a1)/(a2)] in the constituent monomers of the (co)polymer (A1) is 60/40 to 99/1.

5. The moisture resistance improver according to claim 1, wherein the (co)polymer (A) is a combination of the (co)polymer (A1) and the (co)polymer (A2) with the weight ratio of the A1 to the A2 [A1/A2] being from 30/70 to 95/5.

6. The moisture resistance improver according to claim 2, wherein the (co)polymer (A) is a combination of the (co)polymer (A1) and the (co)polymer (A2) with the weight ratio of the A1 to the A2 [A1/A2] being from 30/70 to 95/5.

* * * * *